United States Patent [19]

Obayashi et al.

[11] Patent Number: 4,677,599

[45] Date of Patent: Jun. 30, 1987

[54] ULTRA-SONIC DISTANCE MEASURING APPARATUS AND METHOD

[75] Inventors: Hiroaki Obayashi, Yokosuka; Hiroshi Kobayashi, Yokohama, both of Japan

[73] Assignee: Nissan Motor Company, Limited, Kanagawa, Japan

[21] Appl. No.: 746,403

[22] Filed: Jun. 19, 1985

[30] Foreign Application Priority Data

Jun. 20, 1984 [JP] Japan .................................. 59-127159

[51] Int. Cl.⁴ ............................ G01S 9/68; G01S 9/66
[52] U.S. Cl. ........................................ 367/99; 367/97; 367/98
[58] Field of Search ..................................... 367/97-99, 367/84

[56] References Cited

U.S. PATENT DOCUMENTS

| | | |
|---|---|---|
| 2,247,749 | 7/1941 | de Venel . |
| 3,003,783 | 10/1961 | Brueder . |
| 3,029,089 | 4/1962 | Nashman . |
| 3,321,210 | 5/1967 | Delchev . |
| 3,454,922 | 7/1969 | Dory ............................. 367/97 |
| 3,603,612 | 9/1971 | Stafford et al. . |
| 3,608,925 | 9/1971 | Murphy . |
| 3,677,561 | 7/1972 | McNally . |
| 3,827,538 | 8/1974 | Morgan . |
| 3,850,027 | 11/1974 | Nakanishi et al. . |
| 3,902,691 | 9/1975 | Ott . |
| 3,920,283 | 11/1975 | Strader . |

(List continued on next page.)

FOREIGN PATENT DOCUMENTS

| | | |
|---|---|---|
| 0027869 | 5/1981 | European Pat. Off. . |
| 0080291 | 6/1983 | European Pat. Off. . |
| 0091017 | 10/1983 | European Pat. Off. . |
| 0142733 | 5/1985 | European Pat. Appl. . |
| 2053649 | 5/1972 | Fed. Rep. of Germany . |
| 2844028 | 4/1980 | Fed. Rep. of Germany . |
| 463879 | 2/1971 | Japan . |
| 50-40970 | 4/1975 | Japan . |
| 53-26021 | 3/1978 | Japan . |
| 53-38022 | 4/1978 | Japan . |
| 54-103074 | 8/1979 | Japan . |
| 55-109008 | 7/1980 | Japan . |
| 55-114708 | 8/1980 | Japan . |

(List continued on next page.)

OTHER PUBLICATIONS

Eric Rickman, Circle Track, "A Guide to Dirk Track Suspension", pp. 78-87.
A. G. Thompson et al., SAE Technical Paper Series #800520, "An Optimal Linear Active Suspension with Finite Road Preview", 1980.
SAE #680750, "Some Fundamental Limitations of Active and Passive Vehicle Suspension Systems", Erich K. Bender, Oct. 1968.

Primary Examiner—Thomas H. Tarcza
Assistant Examiner—Daniel T. Pihulic
Attorney, Agent, or Firm—Schwartz, Jeffery, Schwaab, Mack, Blumenthal & Evans

[57] ABSTRACT

An ultra-sonic sensor includes a driver circuit outputting a high-frequency driver signal which orders a transmitter to transmit ultra-sonic waves toward a target object. The driver circuit also sends the driver signal to a receiver. The driver signal is superimposed on a receiver signal. The receiver differentiates the receiver signal and compares the differentiated receiver signal level to a threshold level to detect reception of the reflected ultra-sonic wave. The receiver also detects when the transmitter is actively transmitting the ultra-sonic waves toward the object and disables the aforementioned comparison at such times. Accordingly, by comparing the differentiated receiver signal level with the threshold, the influence directly transmitted ultra-sonic waves on detection of the reflected ultra-sonic wave is successfully avoided. In addition, by interrupting the comparison during a period in which the transmitter is transmitting the ultra-sonic waves, the threshold level can be low enough to allow the system to detect the reflected ultra-sonic wave with great sensitivity.

2 Claims, 3 Drawing Figures

U.S. PATENT DOCUMENTS

| | | | |
|---|---|---|---|
| 3,945,664 | 3/1976 | Hiruma . | |
| 3,992,039 | 11/1976 | Hiruma . | |
| 3,995,883 | 12/1976 | Glaze . | |
| 4,065,154 | 12/1977 | Glaze . | |
| 4,100,795 | 7/1978 | Panetti . | |
| 4,105,216 | 8/1978 | Graham et al. . | |
| 4,152,000 | 5/1979 | Meisel, Jr. . | |
| 4,202,049 | 5/1980 | Wetzel | 367/98 |
| 4,327,936 | 5/1982 | Sekiguchi . | |
| 4,333,668 | 6/1982 | Hendrickson et al. . | |
| 4,349,077 | 9/1982 | Sekiguchi et al. . | |
| 4,363,092 | 12/1982 | Abo et al. . | |
| 4,401,310 | 8/1983 | Ishikawa et al. . | |
| 4,402,375 | 9/1983 | Glaze . | |
| 4,433,386 | 2/1984 | Este . | |
| 4,436,318 | 3/1984 | Ichikawa et al. . | |
| 4,473,319 | 9/1984 | Spangler . | |
| 4,483,409 | 11/1984 | Fun . | |
| 4,506,751 | 3/1985 | Stephens . | |
| 4,506,909 | 3/1985 | Nakashima et al. . | |
| 4,526,401 | 7/1985 | Kakizaki et al. . | |
| 4,527,676 | 7/1985 | Emura et al. . | |
| 4,537,275 | 8/1985 | Kimura et al. . | |
| 4,540,188 | 9/1985 | Meloche et al. . | |
| 4,555,126 | 11/1985 | Ishimitsu et al. . | |
| 4,572,317 | 2/1986 | Isono et al. . | |
| 4,600,215 | 7/1986 | Kuroki et al. . | |
| 4,616,848 | 10/1986 | Sugasawa et al. . | |

FOREIGN PATENT DOCUMENTS

| | | |
|---|---|---|
| 55-141085 | 10/1980 | Japan . |
| 56-665 | 1/1981 | Japan . |
| 56-31861 | 3/1981 | Japan . |
| 56-42739 | 4/1981 | Japan . |
| 56-103307 | 8/1981 | Japan . |
| 56-111009 | 8/1981 | Japan . |
| 56-147107 | 11/1981 | Japan . |
| 56-153267 | 11/1981 | Japan . |
| 56-153268 | 11/1981 | Japan . |
| 56-171311 | 12/1981 | Japan . |
| 57-68574 | 4/1982 | Japan . |
| 57-68575 | 4/1982 | Japan . |
| 57-84375 | 5/1982 | Japan . |
| 57-93271 | 6/1982 | Japan . |
| 57-101144 | 6/1982 | Japan . |
| 57-172808 | 10/1982 | Japan . |
| 57-175266 | 10/1982 | Japan . |
| 57-182506 | 11/1982 | Japan . |
| 57-179678 | 11/1982 | Japan . |
| 57-182544 | 11/1982 | Japan . |
| 58-30816 | 2/1983 | Japan . |
| 58-30817 | 2/1983 | Japan . |
| 58-30814 | 2/1983 | Japan . |
| 58-30542 | 2/1983 | Japan . |
| 58-30544 | 2/1983 | Japan . |
| 58-30818 | 2/1983 | Japan . |
| 58-30819 | 2/1983 | Japan . |
| 58-30815 | 2/1983 | Japan . |
| 58-66079 | 4/1983 | Japan . |
| 58-93614 | 6/1983 | Japan . |
| 58-93615 | 6/1983 | Japan . |
| 58-149815 | 9/1983 | Japan . |
| 58-167210 | 10/1983 | Japan . |
| 58-182571 | 10/1983 | Japan . |
| 58-189573 | 11/1983 | Japan . |
| 58-180714 | 12/1983 | Japan . |
| 59-6107 | 1/1984 | Japan . |

ULTRA-SONIC DISTANCE MEASURING APPARATUS AND METHOD

BACKGROUND OF THE INVENTION

The present invention relates generally to an ultra-sonic distance sensor for measuring the distance to an object capable of measuring the elapsed time between transmission of an ultra-sonic wave pulse and receipt of reflected ultra-sonic waves. More specifically, the invention relates to an ultra-sonic distance sensor system which satisfactorily and successfully avoids the adverse influence of directly transmitted ultra-sonic waves.

Published Japanese Patent Application (Tokkai) Showa No. 56-153268, published on Nov. 27, 1981 discloses an ultra-sonic sensor which measures distance by means of ultra-sonic waves. A similar system has been disclosed in Published Japanese Patent Application (Tokkai) Showa No. 56-153267, published on Nov. 27, 1981, in which an estimated maximum distance can be used to determined the discharge of transmission timing of the ultra-sonic sensor wavepulses or packets.

Published Japanese Patent Application (Tokkai) Showa No. 57-182544 and Published Japanese Utility Model Application (Jikkai) Showa No. 55-141085 disclose an ultra-sonic distance sensor used to detect road clearance in front of a vehicle. Application of an ultra-sonic sensor to a height-control system for automotive vehicles has also been disclosed in the European Patent First Publication No. 0 091 017, published on Oct. 12, 1983, which corresponds to the co-pending U.S. patent application Ser. No. 476,519 now U.S. Pat. No. 4,518,169.

In each of these ultra-sonic distance sensors, a ultra-sonic wave transmitter and a receiver are arranged immediately adjoining one another, e.g. in a side-by-side relationship. This allows some of the transmitted ultra-sonic waves to be directly transmitted to the receiver, which interferes with accurate measurement of the distance. This adverse influence on measurement due to directly transmitted ultra-sonic waves must to be overcome for accurate measurement of the distance to the object.

Published Japanese Patent Application (Tokko) Showa No. 58-28554 proposes an ultra-sonic distance sensor with a feature designed to eliminate the effect of the directly transmitted ultra-sonic waves. In the disclosed system, a reference signal is produced in synchronism with transmission of the ultra-sonic wave toward the object. The reference signal varies exponentially with time. The receiver signal level is compared with the reference signal value to detect the reflected ultra-sonic wave while avoiding components due to ultra-sonic waves transmitted directly from the transmitter to the receiver.

Although the aforementioned system reliably eliminates the effect of directly transmitted ultra-sonic waves, a drawback is encountered in that the receiver signal level may drop below the reference signal level due to low target reflectivity or propagation losses. This is reflected in an apparent infinite distance measurement.

SUMMARY OF THE INVENTION

In view of the foregoing prior art, it is an principle object of the present invention to provide an ultra-sonic sensor system which can eliminate the effect of directly transmitted ultra-sonic waves and ensure accurate measurement of distance to a reflective object.

Another and more specific object of the present invention is to provide an ultra-sonic sensor which employs for avoiding interference component due to transmission of the ultra-sonic wave directly from a transmitter to a receiver, which threshold varies with time in a manner having no effect on detection of the reflected ultra-sonic waves.

In order to accomplish the aforementioned and other objects, an ultra-sonic sensor, according to the present invention, includes a driver circuit outputting a high-frequency driver signal which orders a transmitter to transmit ultra-sonic waves toward the object. The driver circuit also sends the driver signal to a receiver. The driver signal is superimposed on a receiver signal. The receiver rectifies and then differentiates the receiver signal and compares the differentiated receiver signal level with a threshold level to check for reception of reflected ultra-sonic waves. The receiver also detects when the transmitter is actively transmitting ultra-sonic waves toward the object and disables the aforementioned comparison at such times.

According to the present invention, by comparing the differentiated receiver signal level with the threshold, interfernce due to directly transmitted ultra-sonic waves is successfully avoided. IN addition, by interrupting comparison during the period in which the transmitter is transmitting ultra-sonic waves, the threshold level can be low enough to allow the system to detect the reflected ultra-sonic wave with great sensitivity.

According to one aspect of the invention, an ultra-sonic sensor system comprises a transmitter means for transmitting ultra-sonic waves of a given frequency toward an object, a receiver means for receiving reflected ultra-sonic waves reflected by the object and producing a receiver signal having a value indicative of the amplitude of the received ultra-sonic waves, a comparator means for comparing the receiver signal to a predetermined threshold and producing a comparator signal when the receiver signal value exceeds the threshold, and a controller producing a trigger signal, at a given timing and for a given duration, which orders the transmitter to transmit the ultra-sonic waves, the controller measuring elapsed time between the onset of the trigger signal and onset of the comparator signal and deriving the distance to the object on the basis of the elapsed time, the controller disabling the comparator during the given duration of the trigger signal.

The receiver means also receives the trigger signal and superimposes the trigger signal component on the received ultra-sonic wave amplitude signal to derive the receiver signal.

The receiver means comprises a receiver for the reflected ultra-sonic waves producing a received amplitude indicative signal and a differentiator for the received amplitude indicative signal which derives the receiver signal.

The trigger signal is a high-frequency signal.

According to another aspect of the invention, a method for measuring the distance to an object by means of an ultra-sonic sensor system, comprises the steps of:

transmitting ultra-sonic waves of a given frequency toward the object;
receiving ultra-sonic waves reflected by the object and producing a receiver signal having a value indicative of the amplitude of the received ultrasonic waves;

comparing the receiver signal to a predetermined threshold and producing a comparator signal when the receiver signal value exceeds the threshold;

producing a trigger signal at a given timing and with a given duration which orders the transmitter to transmit the ultra-sonic waves;

measuring elapsed time between the onset of said given duration of the trigger signal and the onset of the comparator signal and deriving the distance to the object on the basis of the elapsed time; and disabling the comparator throughout the given duration of the trigger signal.

BRIEF DESCRIPTION OF THE DRAWINGS

The present invention will be understood more fully from the detailed description given below and from the accompanying drawings of the preferred embodiments of the present invention, which however, should not be taken to limit the invention to the specific embodiments but are for explanation and understanding only.

In the drawings.

DESCRIPTION OF THE PREFERRED EMBODIMENT

Figure 1:
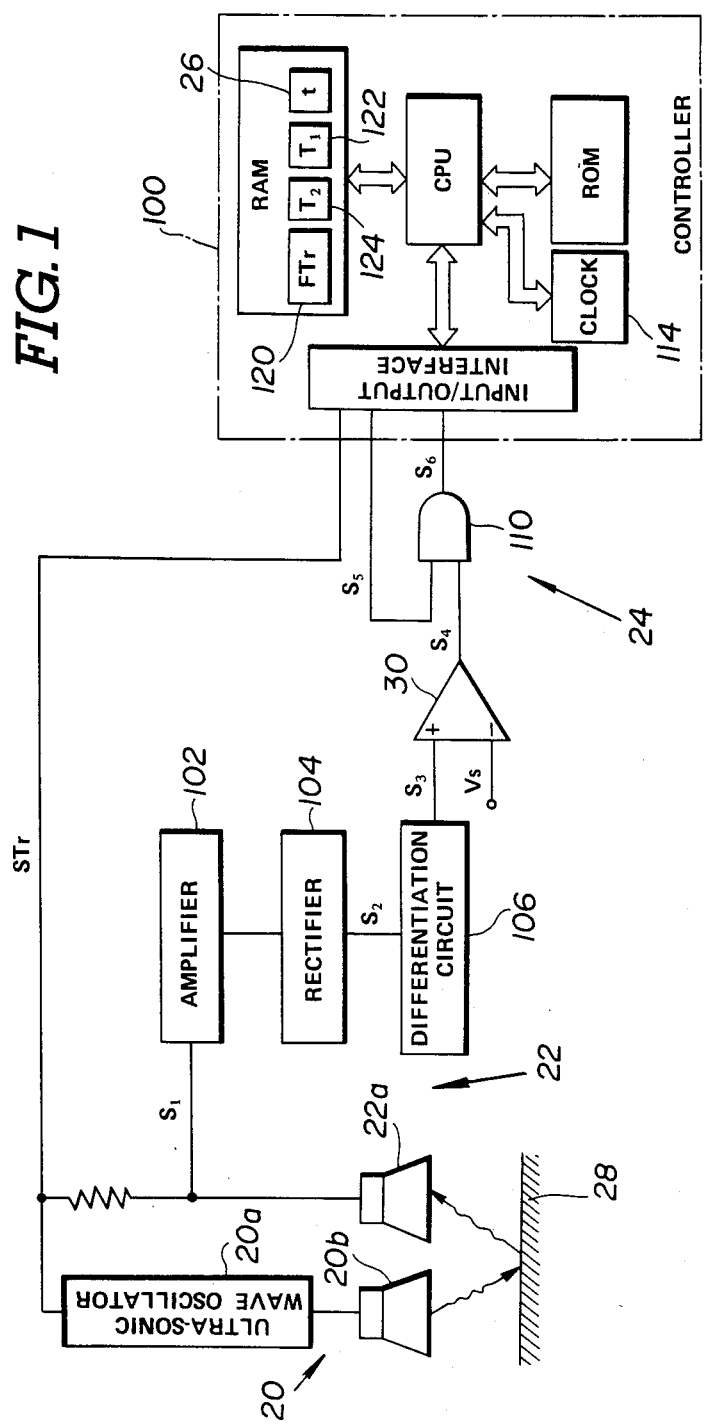
FIG. 1 is a schematic block diagram of the preferred embodiment of an ultra-sonic distance sensor system according to the present invention.

Referring now to the drawings, particularly to FIG. 1, the preferred embodiment of an ultra-sonic distance sensor system generally comprises an ultra-sonic wave transmitter 20, which will be referred to hereafter as "transmitter 20", a reflected ultra-sonic wave receiver 22, which will be referred to hereafter as "receiver 22", and an arithmetic circuit 24 including a timer 26 for measuring the elapsed time T between transmission of ultra-sonic waves and receipt of the ultra-sonic waves reflected by an object 28. The arithmetic circuit 24 then calculates the distance to the object on the basis of the timer value.

The transmitter 20 is triggered at regular intervals to transmit or discharge ultra-sonic waves toward the object 28, such as a road surface in cases where the sensor is used to measure road clearance. The trigger signal STr which triggers the transmitter 20 is output by a controller forming a part of the arithmetic circuit 24. A controller from a different control system, such as an electronic suspension control system, a vehicle-height control system or the like, may be used as the trigger signal controller. The receiver 22 produces a receiver signal having a value which varies according to the amplitude of the received reflected ultra-sonic waves. The arithmetic circuit 24 is also provided with a comparator 30 which compares the receiver signal value to a threshold value. The timer 26 is incorporated in the controller 100 and is designed to measure the elapsed time between transmission and receipt of the ultra-sonic waves.

The transmitter 20 is connected to the output terminal of the controller 100 to receive the trigger signal STr. The trigger signal STr may be a high-frequency signal which orders the transmitter to transmit ultra-sonic waves toward the object 28 when it is present. The transmitter 20 includes an ultra-sonic oscillator 20a and an ultra-sonic wave transmitting section 20b. The oscillator 20a is responsive to the high-frequency trigger signal STr to transmit or discharge ultra-sonic waves through the transmitter section 20b towards the object 28. The controller 100 outputs the trigger signal periodically or intermittently for driving the transmitter with a given intervals. The trigger timing control mediated by the controller will be described in detail later with reference to FIG. 2.

The receiver 22 comprises a reflected ultra-sonic wave receiver section 22a. The receiver section receives the reflected ultra-sonic waves. The receiver section 22a also receives the high-frequency trigger signal. The receiver section 22a produces a receiver signal S1 having a value varying in accordance with the amplitude of the received ultra-sonic waves over which the trigger signal STr is superimposed. The receiver section 22a is connected for output to an amplifier 102 to supply the receiver signal S1. The receiver signal S1 is amplified by the amplifier 102 and sent to a rectifier 104. The rectifier 104 rectifies the amplified receiver signal and outputs the rectified signal to a differentiation circuit 106. The differentiation circuit 106 is connected for output to the non-inverting terminal of the comparator 30. In the comparator 30, the differentiated signal S3 is compared to a predetermined threshold level Vs. Therefore, the comparator output S4 goes HIGH when the differentiated signal level is higher than the threshold level Vs. The comparator 108 is connected for output to one input terminal of an AND gate 110. The other input terminal of the AND gate 110 is connected to the controller 100. The controller 100 normally sends a HIGH-level signal S5 to the AND gate 110 to enable the latter. The controller 100 outputs a LOW-level signal S5 to the AND gate 110 to disable it while the trigger signal STr is being applied to the transmitter section 20.

As shown in FIG. 1, the controller 100 comprises a microprocessor including an input/output interface, CPU, RAM and ROM. The microprocessor 100 is also provided with an internal clock generator 114 and timers 122 and 124. The RAM also includes a flag register 120 for setting/resetting a trigger-signal indicative flag FTr.

Figure 2:
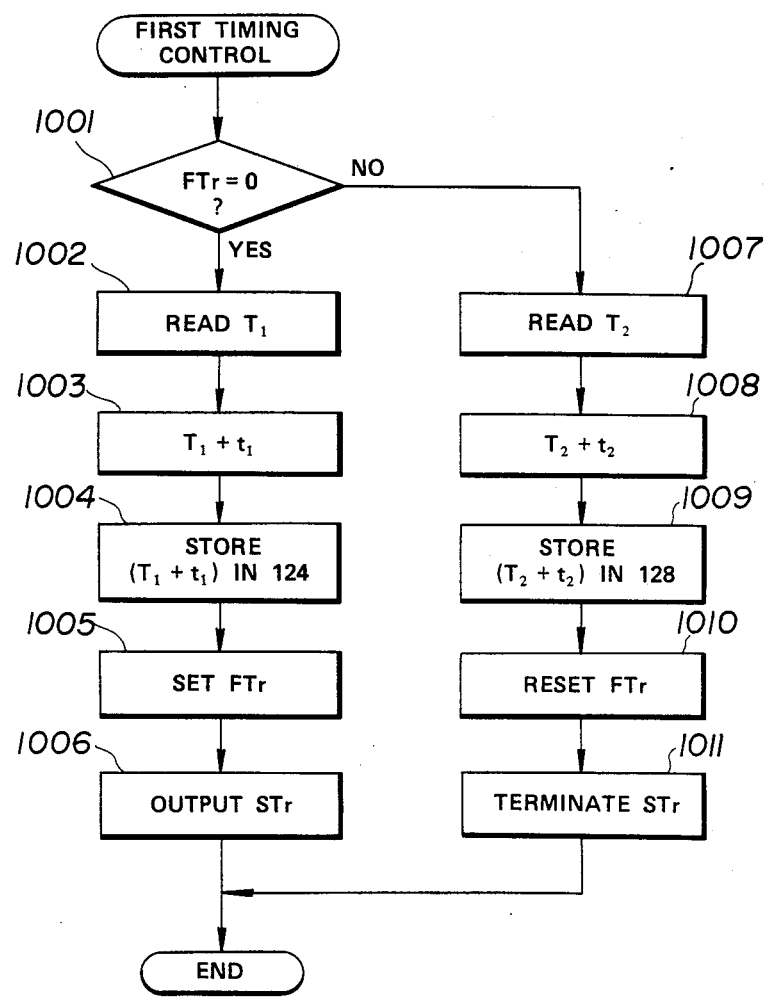
FIG. 2 is a flowchart of an ultra-sonic wave transmission control program to be executed in the preferred embodiment of the ultra-sonic sensor system of FIG. 1.

The controller 100 controls transmission timing of ultra-sonic waves in a manner set out below. FIG. 2 shows a timing control program executed by the controller 100 to control the trigger timing of the ultra-sonic sensor.

At the initial stage of execution of the timing control program, a trigger signal outputindicative flag FTr in a corresponding memory block of RAM, serving as a flag register, is checked at a step 1001. The trigger signal output-indicative flag FTr is set when the trigger signal STr is output through the interface to the transmitter section 20 and is reset when the trigger signal STR is not being output.

If the trigger signal-indicative flag FTr is set when checked at the step 1001, then the timer value T1 of the timer 122 provided in the controller 100 is latched at a step 1002. The timer continuously counts clock pulses from the clock generator 114. A trigger signal ON-time indicative timer value t1 is added to the latched timer value T1 at a step 1003. The resultant value (T1+t1), which serves as a trigger signal OFF-time value, is transferred to and stored in a T2-register of the controller, at a step 1004. Then the flag FTr is set at a step 1005. A HIGH-level output is applied to the output interface as the trigger signal STr at a step 1006.

During the period starting from the time T1, the potential at the output interface is held HIGH to continue application of the trigger signal STr to the transmitter. The timer continues counting the clock pulses and after that period produces a T1-timer signal which serves as a trigger signal for the timing control program.

In response to the T1-timer signal at time T2 marking the end of the period, the timing control program is executed again. Since the trigger signalindicative flag FTr was set at the step 1005 in the previous cycle of the program execution, the answer at the step 1001 is "NO". Thus, control passes to a step 1007 in which the timer value T2 of the second timer is accessed. Similarly to the first-mentioned timer, the timer continuously counts clock pulses from the clock generator. An OFF-interval indicative time value t2 is added to the latched timer value T2 at a step 1008. The time value t2 corresponds to a predetermined interval between successive trigger signals. The resulant timer value (T2+t2) is stored in the T1-timer of the controller at a step 1009. Then, the flag FTr is reset at a step 1010. After the step 1010, the output level at the output interface drops LOW to terminate transmission of the trigger signal to the transmitter, at a step 1011.

The detailed structure and operation of the preferred embodiment of the ultra-sonic sensor has been disclosed in the co-pending U.S. patent application Ser. No. 650,705, filed September 14, 1984 now U.S. Patent No. 4630226. The contents of the above-identified co-pending U.S. Patent Application are hereby incorporated by reference for the sake of disclosure.

It should be appreciated that such a road sensor for detecting road surface conditions has been disclosed in Japanese Patent First Publication Nos. 56-153267 and 56-153268, both published on Nov. 27, 1981. The contents of the above-identified Japanese Patent First Publications are hereby incorporated by reference for the sake of disclosure. In addition, although a road sensor detecting road conditions by means of ultrasonic wave has been specifically disclosed in the preferred embodiment of the invention, the sensor need not be an ultra-sonic-based sensor but can use light, laser beams and so forth. For example, U.S. Pat. No. 4,105,216, issued on Aug. 8, 1978, to Donald E. Graham et al, Japanese Patent First Publication No. 57-182544, published on Nov. 10, 1982, and British Patent First Publication No. 2,090,495, published on July 7, 1982 respectively disclose sensors for detecting road surface conditions or displacement of sprung and unsprung masses in the vehicle suspension system photo-electrically. The contents of these publications are hereby incorporated by reference for the sake of disclosure. Furthermore, Japanese Patent First Publication No. 59-42468, published on Mar. 9, 1984, discloses a procedure for recognizing irregularities in the road surface by means of a road sensor utilizing ultrasonic waves. The procedure disclosed in this Japanese Patent First Publication is also hereby incorporated by reference for the sake of disclosure.

Figure 3:
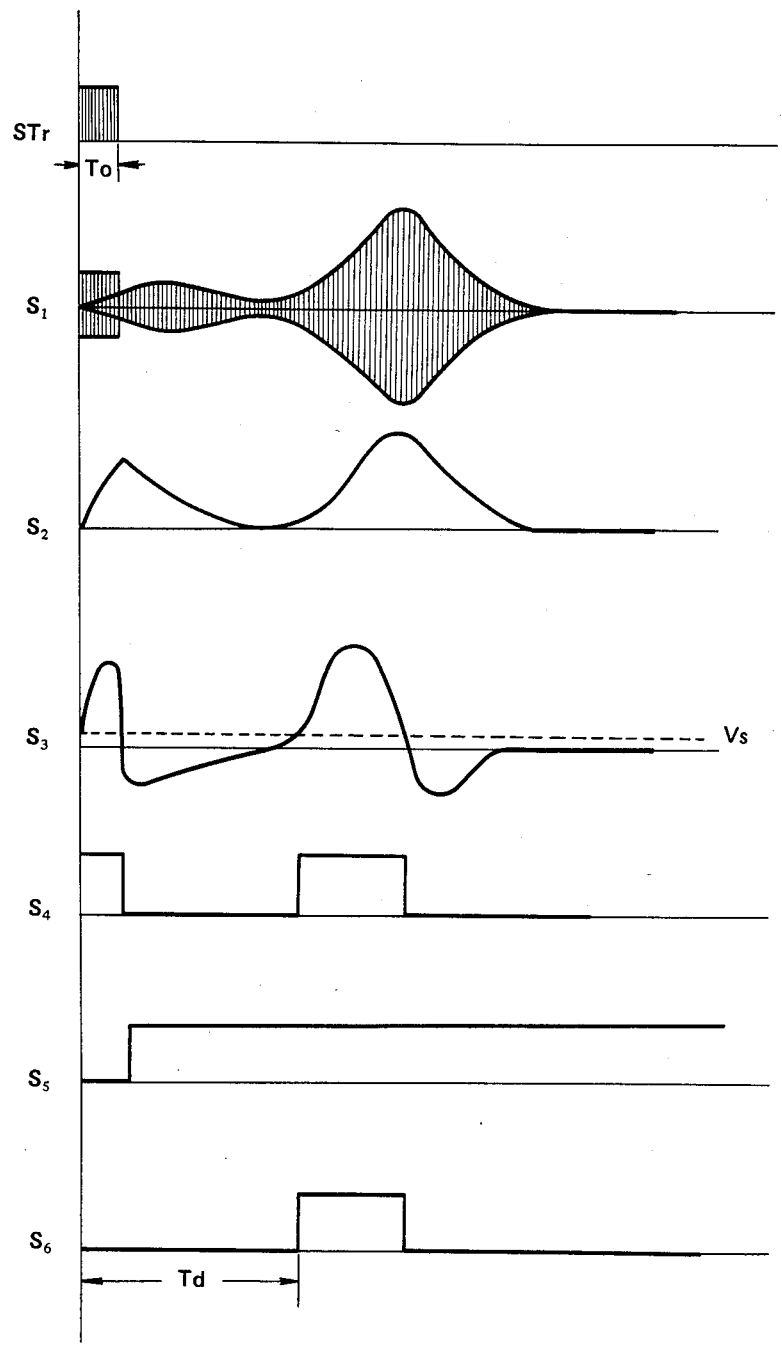
FIG. 3 is a timing chart for the preferred embodiment of the ultra-sonic sensor of FIG. 1.

As shown in FIG. 3, during the period T0 which corresponds to t1 in the above discussion, the high-frequency trigger signal STr is fed to the transmitter section 20. During this period, the high-frequency trigger signal is superimposed on the receiver signal from the receiver section 22. Due to the superimposed trigger signal level, the differentiated signal level tends to exceed the threshold level. Therefore, the output of the comparator 30 goes HIGH. The HIGH level comparator signal S4 is output to the AND gate 110.

However, at this time, the other input S5 to the AND gate 110 from the controller 100 remains LOW. Therefore, the output S6 of the AND gate 110 remains LOW.

When the trigger signal from the controller ends, the trigger signal component superimposed on the receiver signal also disappears. As a result, the receiver signal varies simply with the amplitude of the reflected ultrasonic wave. At the same time, the input level to the AND gate from the controller goes HIGH. This enables the AND gate 110 to respond to the HIGH level comparator signal S4 by outputting a HIGH level gate signal S6.

After a period Td, the differentiated signal level again exceeds the threshold level. This causes the comparator signal to go HIGH. The AND gate 110 then outputs a HIGH level signal to the controller. The controller 100 responds to the leading edge of the HIGH-level gate output by latching the timer value, i.e. Td, which is indicative of the elapsed time between transmission of the ultra-sonic waves to the object 28 and receipt of the reflected ultra-sonic waves.

The velocity V of the ultra-sonic wave is, as is well known, $(331.5+0.607 \times T \text{ m/sec.})$, where T is atmospheric temperature along the propagation path of the ultra-sonic wave. From this and on the basis of the latched timer value Td, the distance h to the object 28 can be derived from the following equation:

$$h = V \times Td/2$$

In summary, the shown embodiment of the present invention set forth above can satisfactorily and successfully eliminate the effect of direct transmission of ultra-sonic waves from the transmitter to the receiver. Therefore, the distance measured by the shown embodiment will not be skewed by the influence of directly transmitted ultra-sonic waves.

Therefore, the present invention fulfills all of the objects and advantages sought therefor.

While a specific embodiment has been disclosed in order to facilitate better understanding of the invention, the invention should not be understood to be limited to the shown embodiment. All possible embodiments and/or modifications to the shown embodiment are to be considered as being within the scope of the invention as long as the embodiments and/or modifications do not depart from the principles of the invention set out in the appended claims.

What is claimed is:

1. An ultra-sonic distance measuring apparatus comprising:
    means for producing a trigger signal at a given timing and for a given duration;
    means for transmitting ultra-sonic waves toward an object in response to said trigger signal;
    means for receiving reflected ultra-sonic waves reflected by the object and producing a receiver signal having a value indicative of the amplitude of the received ultra-sonic waves;
    means for superimposing said trigger signal on said receiver signal to produce a superimposed signal;

means for rectifying said superimposed signal to produce a rectified signal;

means for differentiating said rectified signal to produce a differentiated signal;

means for comparing said differentiated signal with a predetermined threshold level and producing a comparator signal when said differentiated signal exceeds said threshold level;

means for blocking said comparator signal during said given duration of said trigger signal; and means for measuring elapsed time between the onset of said trigger signal and the onset of said comparator signal to derive the distance to said object on the basis of said elapsed time.

2. An ultra-sonic distance measuring method comprising the steps of:

producing a trigger signal at a given timing and for a given duration;

transmitting ultra-sonic waves toward an object in response to said trigger signal;

receiving reflected ultra-sonic waves reflected by the object and producing a receiver signal having a value indicative of the amplitude of the received ultra-sonic waves;

superimposing said trigger signal on said receiver signal to produce a superimposed signal;

rectifying said superimposed signal to produce a rectified signal;

differentiating said rectified signal to produce a differentiated signal;

comparing said differentiated signal with a predetermined threshold level and producing a comparator signal when said differentiated signal exceeds said threshold level;

blocking said comparator signal during said given duration of said trigger signal; ad measuring elapsed time between the onset of said trigger signal and the onset of said comparator signal to derive the distance to said object on the basis of said elapsed time.

* * * * *